United States Patent [19]

Bittner

[11] Patent Number: 5,158,610

[45] Date of Patent: Oct. 27, 1992

[54] ANTICORROSIVE PIGMENTS ON THE BASIS OF TERTIARY ALKALINE-EARTH ALUMINUM PHOSPHATES AND A PROCESS FOR THE PRODUCTION THEREOF

[75] Inventor: Annegret Bittner, Lagelsheim, Fed. Rep. of Germany

[73] Assignee: Dr. Hans Heubach GmbH & Co. KG, Fed. Rep. of Germany

[21] Appl. No.: 582,339

[22] Filed: Sep. 14, 1990

[30] Foreign Application Priority Data

Jul. 3, 1990 [DE] Fed. Rep. of Germany ....... 4021086

[51] Int. Cl.$^5$ .................... C09K 15/02; C01B 25/36; C01B 25/32
[52] U.S. Cl. ................................ 106/462; 106/14.12; 106/14.13; 106/14.14; 106/14.21; 423/629; 423/305; 423/503; 423/DIG. 8
[58] Field of Search ................ 106/462, 14.12, 14.13, 106/14.14, 14.21; 423/629

[56] References Cited

U.S. PATENT DOCUMENTS

| | | | |
|---|---|---|---|
| 2,034,519 | 3/1936 | Larson | 106/462 |
| 2,222,199 | 11/1940 | Fleck | 106/462 |
| 2,974,054 | 3/1961 | Beamesderfer | 106/482 |
| 3,342,669 | 9/1967 | Boggess | 106/462 |
| 4,110,492 | 8/1978 | Hayman | 106/462 |
| 4,294,621 | 10/1981 | Maurer et al. | 106/462 |
| 4,294,808 | 10/1981 | Wasel-Nielsen et al. | 106/462 |
| 4,773,936 | 9/1988 | Clark et al. | 106/462 |
| 4,883,533 | 11/1989 | Kosin et al. | 106/462 |

FOREIGN PATENT DOCUMENTS

| | | |
|---|---|---|
| 0035798 | 9/1981 | European Pat. Off. |
| 2102542 | 8/1972 | Fed. Rep. of Germany |
| 2951126 | 6/1981 | Fed. Rep. of Germany |
| 0045267 | 3/1983 | Japan |

Primary Examiner—William R. Dixon, Jr.
Assistant Examiner—Scott L. Hertzog
Attorney, Agent, or Firm—Venable, Baetjer, Howard & Civiletti

[57] ABSTRACT

The present invention provides anticorrosive pigments on the basis of tertiary alkaline-earth aluminum phosphates, particularly those where the numerical atomic ratio x:y:z of formula $AE_xAl_y(PO_4)_z$ of alkaline earth to aluminum to phosphorus or phosphate is 50–70% to 5–30% to 20–50%. It also provides a process for their production in which an alkaline-earth compound and aluminum compound sufficiently soluble with phosphoric acid are reacted with phosphoric acid, the precipitated pigment is filtered off as usual and dried, optionally calcined and optionally ground.

20 Claims, No Drawings

ANTICORROSIVE PIGMENTS ON THE BASIS OF TERTIARY ALKALINE-EARTH ALUMINUM PHOSPHATES AND A PROCESS FOR THE PRODUCTION THEREOF

Anticorrosive pigments containing phosphate, particularly zinc phosphate, are nowadays used as pigments for anticorrosive coatings, since they have good corrosion-inhibiting properties.

The law on environmental protection restricts the use of pigments containing heavy metals insofar as heavy metal contents may not exceed certain limits in the waste to be disposed and waste water produced by the production plants of paint manufacturers or in the water resulting from processing (spray booths). Corresponding technical steps involving costs have to be taken in order to prevent zinc from getting into the waste water, for example. Although the aluminum-zinc phosphate hydrates and/or the basic aluminum-zinc phosphate hydrates according to European patent 0 054 267, show a reduced solubility of zinc, it is still difficult to observe the stipulated limits.

In addition to the phosphates on the basis of heavy metals, patent literature describes secondary phosphates of the alkaline-earth metals as anticorrosive pigments. However, their efficiency cannot be compared with zinc phosphate. For example, calcium or magnesium hydrogenphosphates are improved, according to European patent 0 028 290, by admixing zinc oxide, while the anticorrosive pigments which are known from DE-PS 37 31 737 and based upon alkaline-earth hydrogenphosphates having a content of alkaline-earth carbonates, primarily protect against filiform corrosion on aluminum.

The object of the present invention is to develop heavy metal-free phosphate pigments on the basis of alkaline-earth metals, which can be used for anticorrosive coatings in general, i.e. also for steel, and are more efficient than the known zinc phosphates. When examining the corrosion protection of phosphate piqments contained in a primer coating common in practice, it was found that, in combination with aluminum, phosphates on the basis of magnesium and/or calcium have better anticorrosive properties than secondary phosphates, on the basis of calcium or magnesium, and tertiary phosphates, on the basis of magnesium, calcium and zinc.

Accordingly, the problem is solved by anticorrosive pigments on the basis of tertiary alkaline-earth aluminum phosphates, with only magnesium and calcium, of course, coming into consideration as alkaline earths for practical reasons.

These anticorrosive pigments are produced in the known per see manner from alkaline-earth and aluminum compounds sufficiently soluble in phosphoric acid as well as phosphoric acid, e.g. alkaline-earth hydrogen or carbonate, aluminum hydroxide and phosphoric acid, at a preferably slightly elevated temperature, a mixed crystal forming from aluminum phosphate and alkaline-earth phosphate. As regards the alkaline-earth phosphate, $Ca_3(PO_4)_2 \cdot n\ H_2O$ and/or $Ca_5(PO_4)_3OH$ (hydroxylapative) could be proved for calcium by means of X-ray affraction. When the aluminum and/or alkaline-earth contents are increased, aluminum oxide hydrate and/or alkaline-earth hydroxide may also be present. The resulting pigments are filtered off, dried as usual and preferably also ground depending on the intended use. Drying is carried out preferably at 100°–110° C., e.g. at about 105° C. If desired, calcining may also be carried out, a temperature of at least about 150° C. usually being sufficient. However, a calcination temperature of about 600° C. or above may also be applied.

As mentioned earlier, only magnesium and calcium come into consideration for practical reasons. For the sake of simplicity, the expression alkaline earths (AE) is used hereinafter, even though only these two alkaline earths are of interest.

The pigments may be represented by the formula $AE_xAl_y(PO_4)_z$. Hereinafter, the ratio x:y:z is referred to as the atomic ratio or numerical atomic ratio which may also be expressed by the formula $AE_xAl_yP_z$. It is repeated expressly that this does not include the atomic weights but, as common in the chemical spelling of formulae, only the number of atoms or atom groups (such as $PO_4$, which, of course, can also be represented only by P as well). The composition may then be given in percent by the percentage of the individual components with respect to the total number of all components. The mixed crystal $Ca_3(PO_4)_2 \cdot AlPO_4 = Ca_3Al(PO_4)_3$ is mentioned by way of example. It has an atomic ratio or atom group ratio of 3 Ca to 1 Al to 3 P or $PO_4$. In this case, the percentage of the individual components is 43% of Ca, 14% of Al and 43% of P or $PO_4$.

In the inventive anticorrosive on the basis of tertiary alkaline-earth aluminum phosphates, the ratio of the three components alkaline earth to aluminum to phosphorus, expressed in the above-defined atomic ratio of x:y:z, is generally 40–70% % of alkaline earth to 5–30% of aluminum to 20–50 % of phosphorus or phosphate, the amounts, of course, being chosen such that 100% result each time. This ratio is preferably 40–65% of alkaline earth to 7–25% of aluminum to 25–45% of phosphorus, and a ratio of 50–65% of alkaline earth to 8–15% of aluminum to 25–35% of phosphorus is particularly preferred.

Thus, it is apparent that relatively more alkaline earth than aluminum and phosphorus is present in the particularly preferred range. The anticorrosive effect is improved when the amount of magnesium and calcium is relatively higher than that of aluminum and phosphorus, but, also within the general ratio, it is markedly above the anticorrosive effect of e.g. zinc phosphate.

The following examples explain the invention and show the results of the anticorrosive test.

EXAMPLE 1

A magnesium-aluminum phosphate hydrate forms when reacting magnesium oxide and/or magnesium carbonate as well as aluminum hydroxide in 10–40% aqueous suspension with conventional industrial phosphoric acid (about 75% by weight).

1 mole of magnesium oxide and 0.2 mole of aluminum hydroxide are used together with 0.6 mole of commercial industrial phosphoric acid (about 75% by weight). The reaction results in slight heating so that, starting from room temperature, a reaction temperature from 30° to 60° C. adjusts depending on the amount of batch. A magnesium aluminum phosphate hydrate forms, whose atomic ratio of magnesium to aluminum to phosphorus is 1.66:0.33:1, i.e. 56% 11% 33% when expressed in percent. The pigment obtained in the reaction batch is filtered off as usual, dried and, depending on intended use, optionally ground. Each of the batches according to the examples was dried at 105° C. Calcining may optionally be carried out as well.

EXAMPLE 2

A calcium-aluminum phosphate hydrate forms when reacting calcium hydroxide and aluminum hydroxide in 10–40% aqueous suspension with conventional industrial concentrated phosphoric acid (75% by weight).

1 mole of calcium hydroxide and 0.16 mole of aluminum hydroxide are reacted with 0.5 mole of phosphoric acid (75 %) at temperatures from 30° to 60° C. Aluminum phosphate forms a mixed crystal together with calcium phosphate which, when investigated by means of X-ray diffraction, consists of $Ca_3(PO_4)_2 \cdot n\, H_2O$, data card No. 18-303, edition 1986, or $Ca_5(PO_4)_3OH$ (hydroxylapatite, data card No. 0-436, edition 1986). The atomic ratio of calcium to aluminum to phosphorus is 2:0.3:1. The precipitated pigment is further treated as indicated in Example 1.

A mixture of alkaline earths may also be present in the alkaline-earth aluminum phosphates using a mixture of the alkaline-earth compounds.

Correspondingly, instead of adding the phosphoric acid to the suspension of the alkaline-earth hydroxide or carbonate and the aluminum hydroxide, the aluminum hydroxide, for example, may be dissolved in the phosphoric acid, and then this component may be added to the suspension of the alkaline-earth compound or, vice versa, the suspension of the alkaline-earth compound may be added to the reaction mixture consisting of aluminum hydroxide and phosphoric acid. For this purpose, the phosphoric acid used is usually the common industrial type having about 75% by weight, since it is the most inexpensive and meets the requirements for purity stipulated herein.

In addition to the pigments used in Examples 1 and 2, which are referred to as pigments 2 and 5 in Table 1 below, the other pigments of this Table were also obtained as according to Examples 1 and 2.

The investigation and evaluation of the anticorrosive behavior of these pigments were carried out as follows:

The anticorrosive pigments of the following Table 1 were investigated in a primer coating in the salt spray test and humidity test with respect to their anticorrosive effect in comparison with tertiary magnesium, calcium and zinc phosphate as well as a secondary calcium phosphate.

| Binding agent | short-oil alkyd resin |
|---|---|
| PVC/CPVC (pigment volume concentration/critical pigment volume concentration | 0.7 |
| formulation example | see Table 2 |
| dry film thickness | 45 +/− 5 microns |
| drying conditions | 7 days at room temperature and 2 hours at 50° C. |
| anticorrosive test | Salt spray test, ASTM D714-56 after 360 hours Humidity test, ASTM D2247-68 after 500 hours |
| evaluation | 30 minutes after weathering. |

In order to evaluate the anticorrosive behavior, data conforming to the standards, such as degree of blistering according to ASTM D 714-56, creepage at the scribe according to ASTM D 1654-75 and corrosion of the metal surface according to ASTM D 610-68, is rated according to the enclosed evaluation pattern of Tables 3 and 4 and combined to an overall evaluation (rating) (100=best anticorrosive value, 0=poorest anticorrosive value).

In order to accurately determine the degree of rusting, the coatings were removed by pickling from the base material by means of methylene chloride after weathering.

TABLE 1

Anticorrosive test - results of short-term weathering

Overall rating

| | | atomic ratio x:y:z | Salt spray test ASTM D 714-56 after 360 hours | | | | Humidity test ASTM D 2247-68 after 500 hours | | |
|---|---|---|---|---|---|---|---|---|---|
| | | | Degree of blistering ASTM D 714-56 | Creepage at the scribe ASTM D 1654-74 (in mm) | Degree of rating ASTM D 610-68 (in %) | ratings | Degree of blistering ASTM D 714-56 | Degree of rusting ASTM D 610-68 (in %) | ratings |
| | $Zn_3(PO_4)_2 \cdot x\, H_2O$ | | 80 (8F) | 65 (2) | 20 (33) | 46 | 50 (6M) | 0 (50) | 17 |
| | $Mg_3(PO_4)_2 \cdot x\, H_2O$ | | 80 (8F) | 70 (1,5) | 20 (33) | 48 | 65 (4F) | 0 (50) | 22 |
| | $CaHPO_4 \cdot x\, H_2O$ | | 65 (4F) | 35 (8) | 20 (33) | 35 | 45 (0) | 0 (50) | 15 |
| | $Ca_5(PO_4)_3OH$ | | 65 (4F) | 80 (1) | 20 (33) | 46 | 45 (4M) | 0 (50) | 15 |
| Pig. 1 | $Mg_xAl_y(PO_4)_z \cdot n\, H_2O$ | 1:0,3:1 | 70 (<4F) | 80 (1) | 20 (33) | 48 | 55 (8M) | 20 (33) | 31 |
| Pig. 2 | " | 1,66:0,3:1 | 70 (<4F) | 70 (1,5) | 60 (10) | 65 | 55 (8M) | 40 (16) | 45 |
| Pig. 3 | $Ca_xAl_y(PO_4)_z \cdot n\, H_2O$ | 1:0,3:1 | 60 (2–4F) | 65 (2) | 20 (33) | 41 | 70 (6F) | 0 (50) | 23 |
| Pig. 4 | " | 1,7:0,3:1 | 70 (6F) | 65 (2) | 70 (3) | 69 | 55 (8M) | 60 (10) | 58 |
| Pig. 5 | " | 2:0,3:1 | 60 (2–4F) | 70 (1,5) | 40 (16) | 53 | 30 (6MD) | 60 (10) | 50 |
| Pig. 6 | " | 2,5:0,3:1 | 65 (4F) | 35 (8) | 20 (33) | 35 | 65 (4F) | 0 (50) | 22 |
| Pig. 7 | " | 2:0,4:1 | 60 (2–4F) | 80 (1) | 70 (3) | 70 | 35 (8MD) | 60 (10) | 52 |
| Pig. 8 | " | 2:0,8:1 | 70 (<4F) | 80 (1) | 60 (10) | 68 | 55 (8M) | 40 (16) | 45 |

When investigating corrosion protection by means of the salt spray test, anticorrosive properties were obtained by the new anticorrosive pigments, which were better than those of secondary calcium phosphate and tertiary magnesium, calcium and zinc phosphate. Particularly, the degree of rusting was markedly reduced on the metal surface.

As shown in the above Table 1 containing the results of short-term weathering, the humidity test also revealed that the degree of rusting is reduced by the new pigments.

Below, Table 2 shows the formulation for the production of a primer coating by means of pigment 4 serving as an example; Tables 3 and 4 give the rating pattern for the results of Table 1.

TABLE 2

| Formulation: | parts by weight % | |
|---|---|---|
| short-oil alkyd resin, 60% (34% of special fatty acids) | 46.8 | |
| modified montmorillonite as an anti-settling agent | 0.4 | |
| glycol ether | 1.7 | |
| xylene | 11.3 | premix binders, solvents and additives |
| calcium octoate 10% Ca | 0.1 | |
| pigment 4 | 5.4 | |
| natural barium sulphate | 17.4 | disperse in a pearl mill |
| magnesium silicate | 9.8 | |
| titanium dioxide rutile | 5.6 | |
| lead-free siccative | 1.2 | stir in separately one after the other |
| antioxidants | 0.3 | |
| | 100.0 | |
| PVC in % | = 31 | |
| PVC/CPVC | = 0.7 | |
| non-volatile content in % | = 67 | |

TABLE 3

TABLE OF EVALUATION

| Rating | Degree of blistering ASTM D 714-56 | Creepage at the scribe given in mm ASTM D 1654-74 |
|---|---|---|
| 100-90 | — | 0-0.4 |
| 90-60 | 8 F-2 F | 0.8-3.2 |
| 55-40 | 8 M-2 M | 4.8-6.4 |
| 35-20 | 8 MD-2 MD | 9.5-12.7 |
| 15-0 | 8 D-2 D | 15.9-25 |

TABLE 4

| | rating | degree of rusting ASTM D 610-68 |
|---|---|---|
| 100 | very good | no corrosion or less than 0.01% |
| 80 | good | spot-like corrosion, but less than 1-3% |
| 60 | good - moderate | 10% of the surface corroded |
| 40 | moderate | 16% of the surface corroded |
| 20 | poor | 33% of the surface corroded |
| 0 | very poor | 50% of the surface corroded |

Overall Rating

To obtain the overall rating according to salt spray and humidity test weathering, the individual ratings are added and divided by 4 and 3, respectivley, the ratings mentioned in TABLE 4 being counted twice because of their greater importance.

I claim:

1. Anticorrosive pigments comprising tertiary alkaline-earth aluminum phosphates wherein the numerical atomic ratio x:y:z of the formula $AE_xAl_y(PO_4)_z$ of alkaline earth to aluminum to phosphate, respectively, is 40-65% to 7-25% to 25-45%.

2. Anticorrosive pigments according to claim 1, wherein the ratio x:y:z is 50-65% to 8-15% to 25-35%.

3. Anticorrosive pigments according to claim 1, comprising calcium and/or magnesium phosphate as the alkaline-earth phosphate.

4. Anticorrosive pigments according to claim 1, wherein the numerical ratio of alkaline-earth atoms to phosphate is 1-2.5:1 and the ratio of aluminum proportion to alkaline-earth proportion is 0.3:1-3.5, again expressed as numerical ratio of the atoms.

5. A process for the production of anticorrosive pigments according to claim 1, wherein an alkaline-earth compound and aluminum compound sufficiently soluble for reaction with phosphoric acid are reacted with phosphoric acid and the resulting pigment is filtered off, dried and optionally ground.

6. The process according to claim 5, wherein alkaline-earth hydroxide or carbonate and aluminum hydroxide as well as conventional industrial phosphoric acid are used as the starting materials 7. The process according to claim 5, wherein the pigment is dried at a temperature above 100° C., and optionally calcined at a temperature of about 150° C. or above.

8. The process according to claim 6, wherein the pigment is dried at a temperature above 100° C., and optionally calcined at a temperature of about 150° C. or above.

9. The process of claim 7 wherein the pigment is dried at about 105° C.

10. The process of claim 8 wherein the pigment is dried at about 105° C.

11. Anticorrosive pigments according to claim 2, comprising calcium and/or magnesium phosphate as the alkaline-earth phosphate.

12. Anticorrosive pigments according to claim 2, wherein the numerical ratio of alkaline-earth atoms to phosphate is 1-2.5:1 and the ratio of aluminum proportion to alkaline-earth proportion is 0.3:1-3.5, again expressed as numerical ratio of the atoms.

13. A process for the production of anticorrosive pigments according to claim 2, wherein an alkaline-earth compound and aluminum compound sufficiently soluble for reaction with phosphoric acid are reacted with phosphoric acid and the resulting pigment is filtered off, dried and optionally ground as usual.

14. A process for the production of anticorrosive pigments according to claim 12, wherein an alkaline-earth compound and aluminum compound sufficiently soluble for reaction with phosphoric acid are reacted with phosphoric acid and the resulting pigment is filtered off, dried and optionally ground as usual.

15. The process according to claim 13, wherein alkaline-earth hydroxide or carbonate and aluminum hydroxide as well as conventional industrial phosphoric acid are used as the starting materials.

16. The process according to claim 14, wherein alkaline-earth hydroxide or carbonate and aluminum hydroxide as well as conventional industrial phosphoric acid are used as the starting materials.

17. The process according to claim 13, wherein the pigment is dried at a temperature above 100° C., and optionally clacined at a temperature of about 150° C. or above.

18. The process according to claim 14, wherein the pigment is dried at a temperature above 100° C., and optionally calcined at a temperature of about 150° C. or above.

19. The process of claim 17 wherein the pigment is dried at about 105° C.

20. The process of claim 18 wherein the pigment is dried at about 105° C.